United States Patent [19]

Allori et al.

[11] 4,407,394

[45] Oct. 4, 1983

[54] DYNAMIC BRAKE MOUNT ASSEMBLY

[75] Inventors: Aldo Allori, Brookfield; John A. Wilger, Chicago; Julian D. Voss, Naperville, all of Ill.

[73] Assignee: International Harvester Co., Chicago, Ill.

[21] Appl. No.: 272,147

[22] Filed: Jun. 10, 1981

[51] Int. Cl.³ .............................................. F16D 55/08
[52] U.S. Cl. ................................................... 188/71.4
[58] Field of Search .................... 188/71.4, 71.5, 72.7, 188/72.9; 192/4 A, 93 A

[56] References Cited

U.S. PATENT DOCUMENTS

| | | |
|---|---|---|
| 2,387,039 | 10/1945 | Parrett . |
| 2,732,036 | 1/1956 | Myers . |
| 2,831,552 | 4/1958 | Kershner . |
| 2,874,807 | 2/1959 | Hahn . |
| 3,101,813 | 8/1963 | Parrett . |
| 3,204,727 | 9/1965 | Wilson et al. . |
| 3,392,805 | 7/1968 | Kreitner . |
| 3,583,529 | 6/1971 | Robinson ............................ 188/71.4 |
| 3,842,948 | 10/1974 | Fredrick ............................. 188/71.4 |
| 4,179,016 | 12/1979 | Alderman et al. ............. 188/71.4 X |
| 4,213,519 | 7/1980 | Moser et al. ....................... 188/71.4 |

*Primary Examiner*—Duane A. Reger
*Attorney, Agent, or Firm*—Boris Parad; F. David AuBuchon

[57] ABSTRACT

A dynamic brake mount assembly is disposed within the fluid filled chamber and comprising a brake housing immobilizingly supported by an actuator mechanism housing on one side and by support elements attached to a chamber casing on the other side.

8 Claims, 5 Drawing Figures

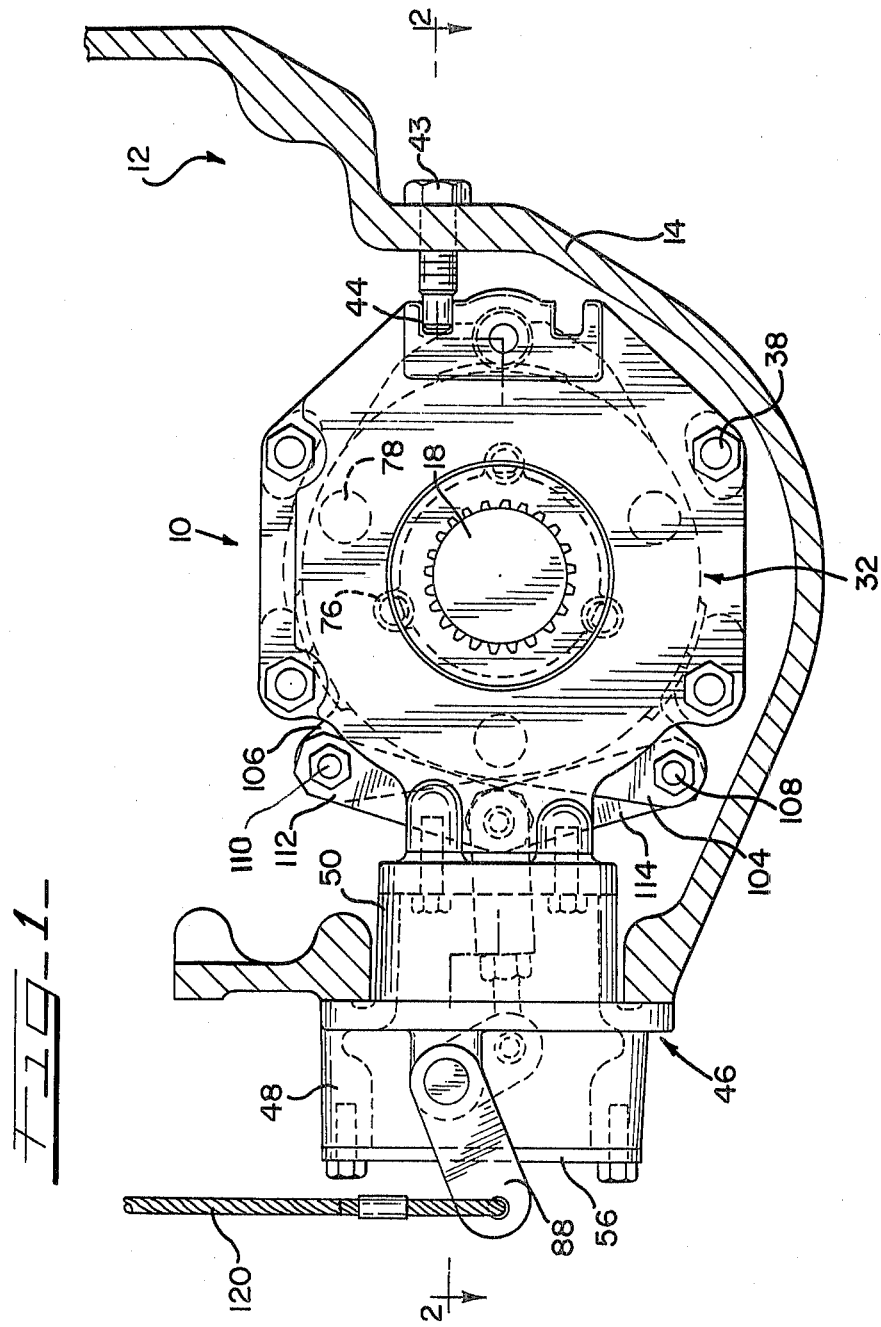

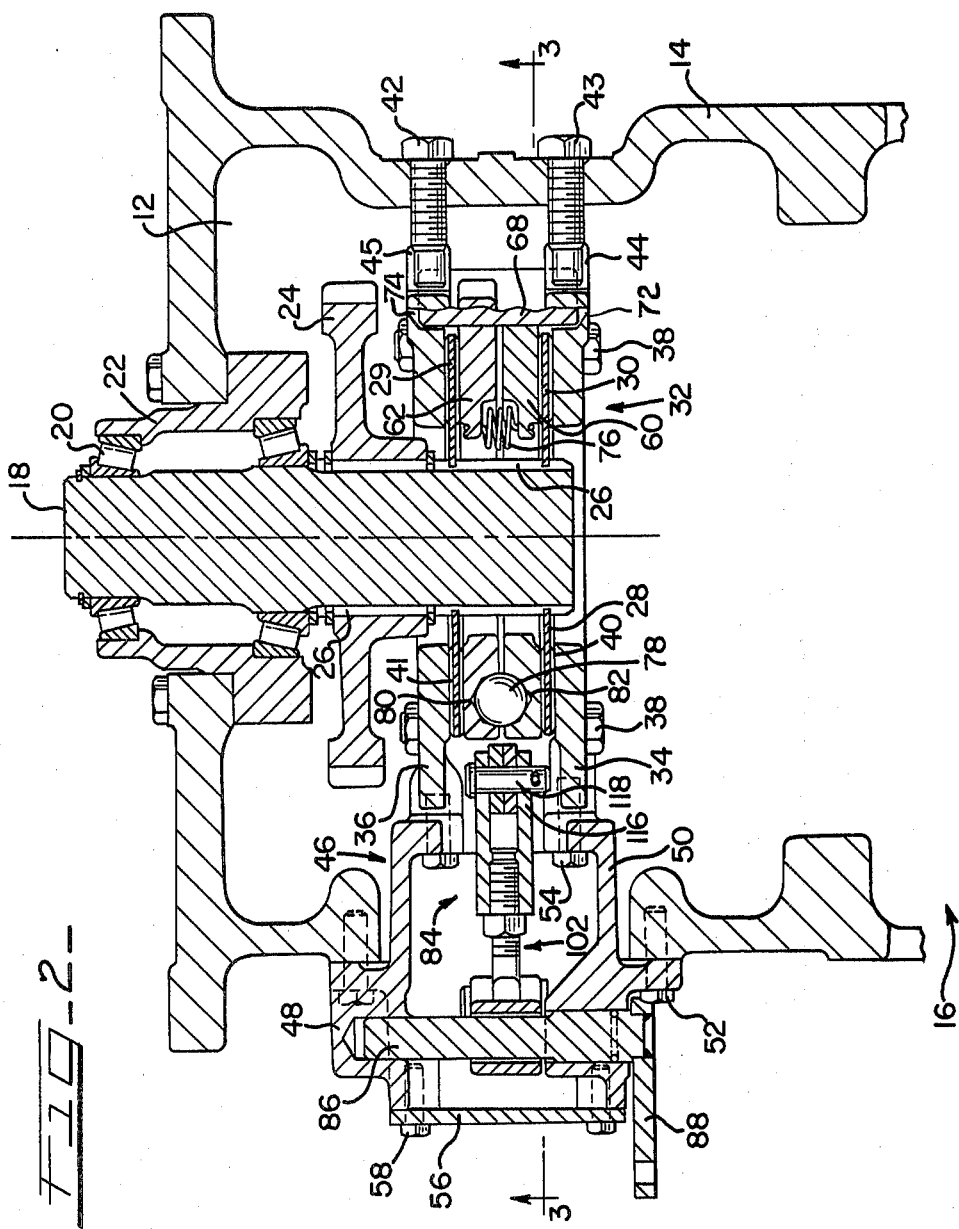

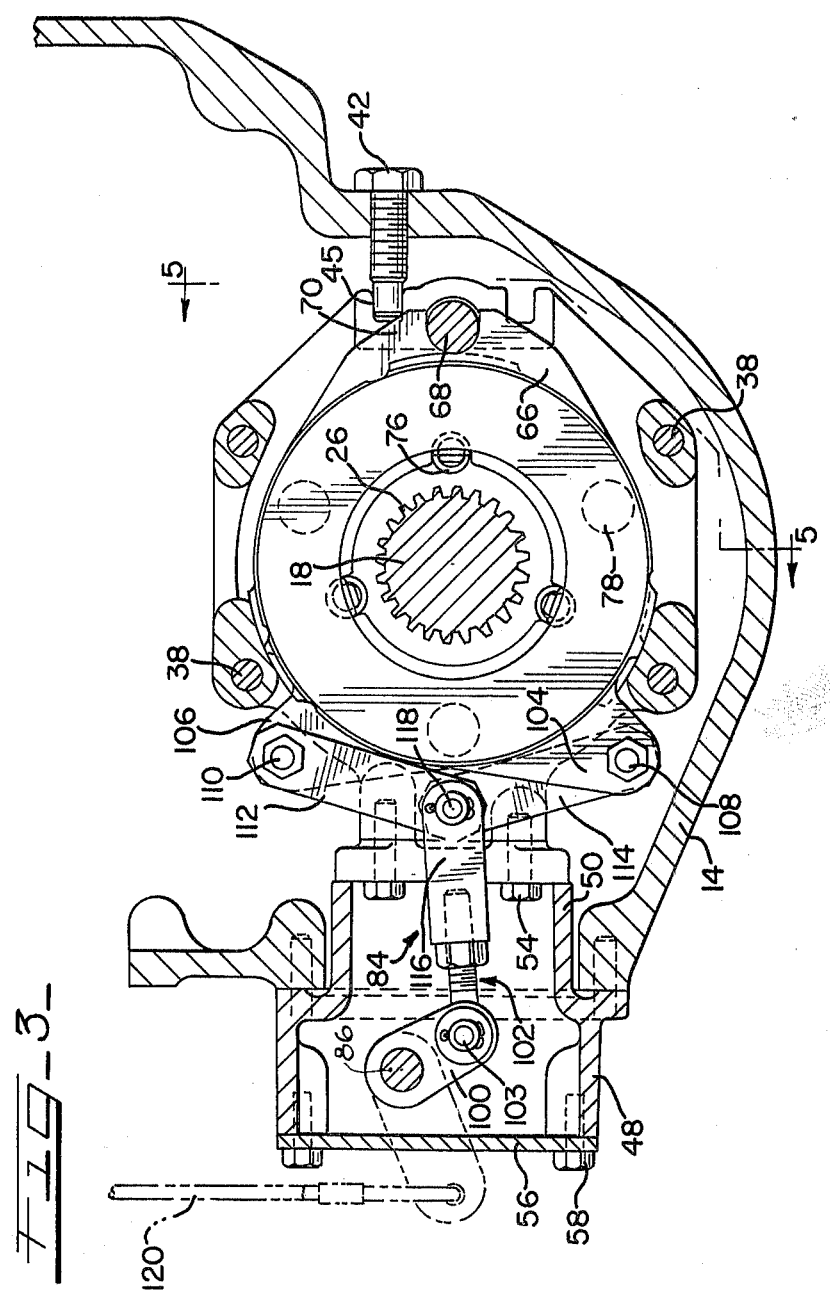

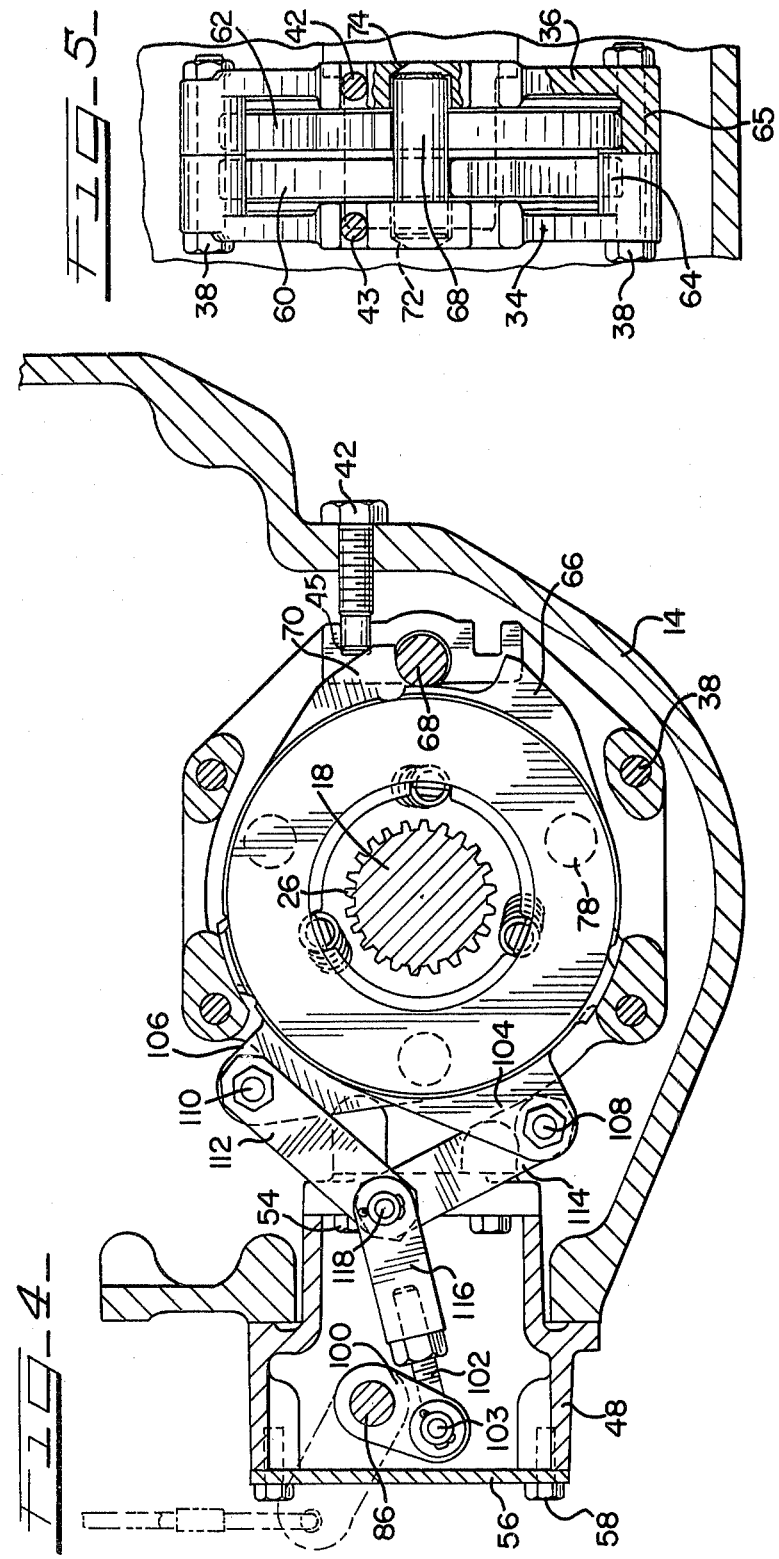

DYNAMIC BRAKE MOUNT ASSEMBLY

BACKGROUND OF THE INVENTION

1. Field of the Invention

This invention relates to disc brakes and more particularly to a mount assembly for a disc brake utilized on agricultural tractors or other machinery having a rotary shaft or other member to be braked.

2. Description of the Prior Art

The prior art is replete with various disc brake mechanisms. For example, the U.S. Pat. No. 3,583,529 discloses a spreading type multiple disc brake which has a pair of relatively rotatable pressure plates mounted in the brake housing, an actuator for relatively rotating the pressure plates, and ball ramp for separating the plates upon relative rotation.

Another U.S. Pat. No. 3,392,805 discloses an adjustable brake actuating mechanism for a disc brake, which mechanism includes a rod connected with a lever through an adjustable nut member having ratchet teeth on its periphery.

Still another U.S. Pat. No. 4,179,016 discloses a final drive gearing with a multi-disc brake which can frictionally interconnect the half-shaft and the casing, and is operated via a linkage by a hydraulic slave cylinder housed within the casing.

However, none of the prior art references of record discloses the novel dynamic brake mount assembly as specified in the subject invention.

SUMMARY OF THE INVENTION

According to the invention, a dynamic brake mount assembly comprises a chamber casing and a rotatable shaft disposed within the chamber. Coaxially spaced brake discs are removably attached to and rotatable with the shaft. A brake housing is extended about the shaft and frictionally engageable with the brake discs. An actuator mechanism housing is mounted on the casing and rigidly attached to the brake housing, thereby immobilizingly supporting one side of the housing within the chamber. Support means are attached to the casing and immobilizingly supporting another side of the housing within the chamber. A pair of cooperating pressure plates is located within the brake housing and between the discs. The plates are axially displaceable upon rotational movement thereof in opposite directions by an actuator mechanism means. Cam means are disposed intermediate the plates for forcing the plates apart and into frictional interengagement with the rotating discs, thereby retarding the shaft rotation.

BRIEF DESCRIPTION OF THE DRAWINGS

FIG. 1 is a side elevational view of a dynamic brake mount assembly;

FIG. 2 is a cross-sectional view of the brake mount assembly taken substantially along the line 2—2 of FIG. 1;

FIG. 3 is a cross-sectional view taken substantially along the line 3—3 of FIG. 2 showing an actuator mechanism in a non-braking position;

FIG. 4 is a cross-sectional view taken along the line 3—3 of FIG. 2 showing the actuator mechanism in a braking position; and FIG. 5 is a view in section, as taken along the line 5—5 of FIG. 3.

DESCRIPTION OF THE PREFERRED EMBODIMENT

Referring now to the drawings wherein reference characters designate like or corresponding parts throughout the several views, there is shown in FIGS. 1 and 2 a disc brake assembly 10 disposed within the chamber 12. The chamber 12 is defined by a stationary chamber casing 14 mounted on a vehicle, such as an agricultural tractor. The chamber 12, which can be a transmission reservoir or the like case, is filled with the fluid such as transmission oil or other substance. The casing 14 has a service opening 16, as shown in FIG. 2 for removal and installation of the disc brake assembly 10. A rotatable shaft 18 is journalled in the casing 14 and carried by bearings 20 in a bearing casing 22 rigidly attached to the casing 14. A dynamic brake driven gear 24 is rigidly secured on splines 26 on the rotatable shaft 18. A pair of coaxially spaced brake discs 28, 29 are also secured on splines 26. Each of the discs 28, 29 carries on each side a ring of friction material or surface 30.

A brake housing 32 comprises a pair of substantially circular plates 34, 36 rigidly attached to each other by means of bolts 38 or other suitable mechanical means. The brake housing plates 34, 36 extend about the shaft 18 and frictionally engageable with discs 28, 29 at their inboard portions 40, 41. The brake housing 32 is immobilizingly supported on one side by support bolts or other suitable mechanical means 42, 43 extending through the casing 14 into the brake housing cavities 44, 45 and on the other side by an actuator mechanism housing 46. The actuator mechanism housing 46 extends through the casing 14 and has an outer portion 48 extending outwardly of the casing 14 and inner portion 50 projecting into the chamber 12. The outer portion 48 is rigidly attached to the casing 14 by bolts 52 and the inner portion 50 is secured to the brake housing 32 by bolts 54. A cover 56 is securely attached to the outer portion 48 by bolts 58. The actuator mechanism housing 46 and bolts 42, 43 stationary support the brake housing 32 with its contents without compromising the leakproof integrity of the chamber casing 14.

A pair of cooperating pressure plates 60 and 62 is located within the brake housing 32 and between the discs 28, 29. As best shown in FIG. 5, the brake housing has inwardly projecting and peripherally spaced bosses 64, 65 slidably supporting the pressure plates 60 and 62 substantially central in the brake housing 32. The pressure plate 60 has a radially outwardly projecting lug 66 abuttingly engaging a stop torque pin 68. The pressure plate 62 has a similar lug 70 engageable the stop torque pin 68 when the pressure plates 60, 62 are turned in the opposite direction. The ends of the stop torque pin 68 are unsecurely disposed in the recesses 72 and 74 facing each other in the brake housing plates 34, 36. The two pressure plates 60, 62 are urged toward each other by a plurality of peripherally and equidistantly spaced tension springs 76 attached to and located between plates 60, 62. The pressure plates 60 and 62 are generally circular and are in face-to-face relationship with each other, the adjacent faces being separated by steel balls 78. A plurality of camming balls 78 is disposed in circumferential and equidistantly spaced relation between the pressure plates 60 and 62 and sitting in oppositely inclined ramped seats 80, 82 which are located in the opposing faces of the pressure plates 60, 62.

The actuator mechanism 84 comprises a crank shaft 86 located within and supported by the outer portion 48. The crank shaft 86 is parallel to the rotatable shaft 18 and disposed exteriorly of the chamber casing 14. A crank lever 88 is rigidly attached to the crank shaft 86 which has a projecting outwardly bracket 100. The bracket 100 is pivotally connected with a pull rod 102 by a pin 103.

Ears 104 and 106 are formed integrally with and project radially from the pressure plates 60 and 62 at circumferentially spaced locations as shown best in FIGS. 1, 3 and 4. These ears are respectively connected by pins 108 and 110 with outer ends of toggle links 112 and 114 which extend toward each other adjacent the periphery of the pressure plates 60, 62. Overlapping inner ends of the toggle links 112, 114 are embraced by the yoke portion 116 of the pull rod 102. A pivot pin 118 serves to connect the yoke portion 116 with inner ends of the toggle links 112, 114. A cable 120 is attached to the crank lever 88.

In operation, when a crank 88 is pulled upwardly by a cable 120 attached thereto, the crank shaft 86 and bracket 100 are turned clockwise. The bracket 100 would pull the pull rod 102 which in turn would pull the inner ends of the toggle links 112, 114 outwardly, thereby rotating the plates 60, 62 in opposite directions. Tension springs 76 bias the two pressure plates 60, 62 together and trap the balls 78 therebetween while permitting the pressure plates 60, 62 to move angularly relative to each other, and hence axially relative to each other, by virtue of the movement of the camming balls 78 in the ramps 80, 82.

When a pull is applied to the links 112, 114 the toggle link 114 will pull the plate 60 in a clockwise direction and the toggle link 112 will pull the plate 62 in a counterclockwise direction. This causes the camming balls 78 to urge the plates 60, 62 to move apart and into frictional engagement with the rotating discs 28, 29 which in turn will be pressed against the brake housing portions or surfaces 40, 41. Thereafter, assuming that the discs 28, 29 are rotating in a clockwise direction the plates 60, 62 would start to rotate together with the discs 28, 29 until the projecting lug 70 of the plate 62 abuts the stop torque pin 68 in the reactive engagement and the plate 62 will be held against further rotational movement. The plate 60, however, continues to rotate so that the plates 60, 62 are urged apart by the brake. When the direction of rotation of the discs 28, 29 is reversed, the function of the plates 60, 62 are exchanged but the operation is the same. This frictional squeeze of the rotating discs 28, 29 between the pressure plates 60, 62 and the brake housing surfaces 40, 41 will retard the rotational movement of the rotatable shaft 18.

Service or dismantling of the brake assembly can be accomplished by removing the brake housing 32, discs 28, 29 and pressure plates 60, 62 through the casing opening 16 and by detaching the actuator mechanism housing 46 from the casing 14.

The foregoing description and drawings merely illustrate the invention and the invention is not limited thereto, except insofar as the appended claims are so limited, and so those skilled in the art who have the disclosure before them will be able to make modifications and variations therein without departing from the scope of the invention.

What is claimed is:

1. A dynamic brake mount assembly comprising:
    a fluid filled chamber defined by a chamber casing;
    a rotatable shaft disposed within said chamber;
    coaxially spaced brake discs removably attached to and rotatable with said shaft;
    a disassembleable brake housing extended about said shaft and frictionally engageable with said brake discs for retarding the shaft rotation;
    at least a pair of cooperating pressure plates located within said brake housing and between said discs;
    said plates being axially displaceable upon rotational movement thereof in opposite directions;
    an actuator mechanism means for rotating said plates in opposite directions; and
    cam means disposed intermediate the plates forcing the plates apart and into frictional interengagement with said discs;
    said brake housing being stationary located within said chamber space by an actuator mechanism housing and detachable support means;
    said actuator mechanism housing partially encompassing said actuator mechanism means being mounted on said casing and rigidly attached to one side of said brake housing;
    said detachable support means interconnecting said casing with another side of said brake housing for immobilizing support thereof within said chamber space.

2. The dynamic brake mount assembly according to claim 1, and
    said brake housing comprising a pair of plates detachably secured to each other and both of them having a recess in registry with each other;
    stop torque means removably supported by said brake housing for abutting engagement with said pressure plates to arrest rotational movement of one of said plates;
    said stop torque means comprising a stop torque pin with ends thereof being located within said recesses for enclosing and floating support thereof within and by said brake housing.

3. The dynamic brake mount assembly according to claim 1, and said support means comprising at least a pair of bolts removably extending through said casing and protruding into said brake housing;
    said bolts support said brake housing without compromising a leak-proof integrity of said chamber casing.

4. The dynamic brake mount assembly according to claim 1, and:
    said actuator mechanism housing projecting through said casing and having outer and inner portions;
    said outer portion removably attached to said casing and extending outwardly of said chamber casing; and
    said inner portion detachably secured to said brake housing and extending inwardly into said chamber;
    said actuator mechanism housing supporting said brake housing without compromising a leak-proof integrity of said chamber casing.

5. The dynamic brake mount assembly according to claim 1, and said brake housing being assembled and disassembled through a service opening in said chamber casing being coaxial with said shaft and said brake housing.

6. The dynamic brake mount assembly according to claim 1, and said actuator mechanism housing and said support means disposed transversely to said shaft and in opposition to each other;

said actuator mechanism housing and said support means being removable through said chamber casing and laterally to said shaft.

7. The dynamic brake mount assembly according to claim 1, and said actuator mechanism means comprising:

a crank shaft located within and supported by said actuator mechanism housing;

said crank shaft being parallel to said rotatable shaft and disposed exteriorly of said chamber casing;

a crank lever rigidly attached to said crank shaft for rotating thereof;

each of said pressure plates being of substantially circular configuration and having a link pivotally connected thereto;

a pull rod pivotally connected with said crank shaft and with each of said links;

said cam means comprising a plurality of circumferentially spaced balls trapped in complementary pairs of ramped recesses in the adjacent faces of said plates; and spring means connecting and urging said plates to move toward each other.

8. A dynamic brake mount assembly comprising:

A fluid filled chamber defined by a chamber casing;

a rotatable shaft projecting through the casing into said chamber space;

coaxially spaced brake discs removably attached to and rotatable with said shaft;

an immovable brake housing extending about said shaft and frictionally engageable with said brake discs;

an actuator mechanism housing projecting through said casing and having inner and outer portions;

said outer portion extending outwardly of and detachably secured to said casing;

said inner portion extending inwardly into said chamber and rigidly attached to said brake housing, thereby immobilizingly supporting one side thereof;

support bolts mounted on said casing and stationary supporting another side of said housing;

a pair of cooperating pressure plates coaxially disposed within said brake housing and between said discs;

said plates being axially displaceable upon rotational movement thereof in opposite direction;

an actuator mechanism means for rotating said plates in opposite directions being partially disposed within said actuator mechanism housing;

cam means disposed intermediate the plates for forcing the plates apart and into a frictional engagement with said discs; and stop torque means supported by said brake housing for abutting engagement with said pressure plates to arrest rotational movement of one of said plates upon rotation in one direction and of the other plate in an opposite direction;

said brake housing being supported by said actuator mechanism housing and said support bolts without compromising a leak-proof integrity of said chamber casing;

said brake housing, brake discs and plates being assembled and removable through a service opening in said chamber casing and coaxial with said shaft.

* * * * *